United States Patent
Linam et al.

(10) Patent No.: US 6,789,584 B2
(45) Date of Patent: Sep. 14, 2004

(54) FLUID CONTAINMENT APPARATUS

(76) Inventors: Charles B. Linam, 373 Linam La., Cedar Creek, TX (US) 78612; Kurt J. Buchmann, 12317 Scribe Dr., Austin, TX (US) 78759

( * ) Notice: Subject to any disclaimer, the term of this patent is extended or adjusted under 35 U.S.C. 154(b) by 112 days.

(21) Appl. No.: 10/107,639

(22) Filed: Mar. 26, 2002

(65) Prior Publication Data

US 2003/0184083 A1 Oct. 2, 2003

(51) Int. Cl.$^7$ ............................. B65B 1/04; B65B 3/04; B67C 3/02
(52) U.S. Cl. ............................. 141/93; 141/44; 141/51; 141/65; 137/15.11; 137/314
(58) Field of Search ....................... 141/65, 86, 44, 141/51, 52, 93, 115; 137/15.11, 171, 312, 314; 222/108; 138/97

(56) References Cited

U.S. PATENT DOCUMENTS

| | | | |
|---|---|---|---|
| 1,108,840 A | * 8/1914 | Franke | 137/375 |
| 4,046,406 A | * 9/1977 | Press et al. | 285/47 |
| 5,022,685 A | 6/1991 | Stiskin et al. | 285/45 |
| 5,072,622 A | 12/1991 | Roach et al. | 73/40.5 R |
| 5,141,256 A | 8/1992 | Ziu | 285/13 |
| 5,343,191 A | 8/1994 | McAtamney | 340/605 |
| 5,368,338 A | 11/1994 | Greene et al. | 285/133.1 |
| 5,533,760 A | 7/1996 | Welch | 285/14 |
| 5,546,977 A | 8/1996 | Chaney | 137/312 |
| 5,615,700 A | 4/1997 | Chaney et al. | 137/15 |
| 5,918,267 A | 6/1999 | Evans et al. | 73/40.5 R |
| 6,029,505 A | 2/2000 | Webb | 73/40.5 R |
| 6,164,345 A | * 12/2000 | Haddox | 141/86 |
| 6,260,587 B1 | * 7/2001 | Smith, Jr. | 141/59 |
| 6,260,725 B1 | 7/2001 | Gonzales et al. | 220/4.21 |
| 6,298,881 B1 | 10/2001 | Curran et al. | 137/884 |
| 6,305,719 B1 | 10/2001 | Smith, Jr. et al. | 285/15 |

* cited by examiner

*Primary Examiner*—Timothy L. Maust
(74) *Attorney, Agent, or Firm*—Moser, Patterson & Sheridan, NJ; Peter J. Sgarbossa

(57) ABSTRACT

A method and apparatus for preventing leakage from a fitting coupling a first and second fluid supply line to an environment surrounding the fitting is generally provided. In one embodiment, a containment apparatus includes a body having a first, second and third aperture formed therethrough. The body defines interior volume that is adapted to substantially enclose the fitting. The interior volume is adapted to be maintained at a pressure less than the surrounding environment to prevent fluid that may leak from the fitting from being released into the surrounding environment. In another aspect of the invention, a method for preventing fluid leakage from a fitting coupling a first and second conduit from entering an environment surrounding the fitting includes enclosing the fitting in a volume defined between a first shell and a second shell, evacuating the volume, and drawing air into the volume from between the shells.

30 Claims, 4 Drawing Sheets

FLUID CONTAINMENT APPARATUS

BACKGROUND OF THE INVENTION

1. Field of the Invention

Embodiments of the invention generally relate to a fluid leakage containment apparatus for use with fittings used to couple fluid lines.

2. Background of the Related Art

It is generally undesirable for fluids to escape from their containers or conduits and enter into the surrounding environment. This is particularly true in the semiconductor manufacturing industry where the fluids used during integrated circuit fabrication are expensive and/or may pose a serious threat to the environment and operators who may come in contact with released fluid. Examples of such fluids include chlorine, ammonia, hydrofluoric acid and chlorine, among many others.

In a typical semiconductor processing system, fluids are delivered to a processing chamber through conduits coupled to a gas panel. The gas panel generally controls the sequence, pressure and rate that various fluids are delivered to the processing chamber. Typically, fluids are supplied to the gas panel from vessels or the processing facility's central supply. Generally, when one of the fluids being transferred between the gas panel and the process chamber poses a safety or environmental threat, the fluid lines, valves and/or fittings are equipped with a containment apparatus to prevent any leaking fluid from entering the environment.

For example, one example of a conventional containment apparatus is described in U.S. Pat. No. 6,298,881, issued Oct. 9, 2001 to Curran et al. Curran et al. generally describes a valve having a primary seal for retaining working fluids and a containment seal that circumscribes the primary seal. The containment seal is generally an elastomer compressed to seal the valve components. A vacuum source is coupled to a volume defined between the primary and containment seals to remove any working fluid that may have leaked beyond the primary seal.

However, containment seals utilized on these conventional containment apparatus are subject to damage during installation and wear over time. Additionally, as containment seals are exposed to corrosive or other reactive fluids over time, the seals may swell, shrink, crack, become brittle or otherwise exhibit some change in physical property that diminishes the effectiveness of the seal, thus creating a loss of vacuum and a potential leak path for the fluid to enter the environment defeating the containment apparatus.

Therefore, there is a need for an improved containment apparatus.

SUMMARY OF THE INVENTION

A method and apparatus for preventing leakage from a fitting coupling a first and second fluid supply line to an environment surrounding the fitting is generally provided. In one embodiment, a containment apparatus includes a body having a first, second and third aperture formed therethrough. The body defines an interior volume that is adapted to substantially enclose the fitting. The interior volume is adapted to be maintained at a pressure less than the surrounding environment to prevent fluids that may leak from the fitting from being released into the surrounding environment.

In another embodiment, a containment apparatus includes a first shell and a second shell that define a volume adapted to enclose the fitting. Each shell has an abutment surface that is disposed against the abutment surface of the other shell. The adjoining abutment surfaces define a gas permeable parting line. A first, second and third aperture are formed at least partially in the first or second shells. The apertures are adapted to facilitate routing fluid lines coupled to the fitting and coupling the containment apparatus to a vacuum source. In another embodiment, a containment apparatus prevents leakage from a fitting coupling a gas panel to a semiconductor processing chamber from reaching the surrounding environment.

In another aspect of the invention, a method for preventing fluid leakage from a fitting coupling a first and second conduit from entering an environment surrounding the fitting includes the steps of enclosing the fitting in a volume defined between a first shell and a second shell, evacuating the volume, and drawing air from the surrounding environment into the volume from between the shells.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

A containment apparatus for preventing fluids, typically gases, from escaping into the surrounding environment from a fitting coupling two or more fluid lines is generally provided. Although the containment apparatus is described as utilized in a semiconductor processing system, the containment apparatus may be used in other applications wherever the prevention of fluid leakage from an object into the surrounding environment is desired.

Figure 1:
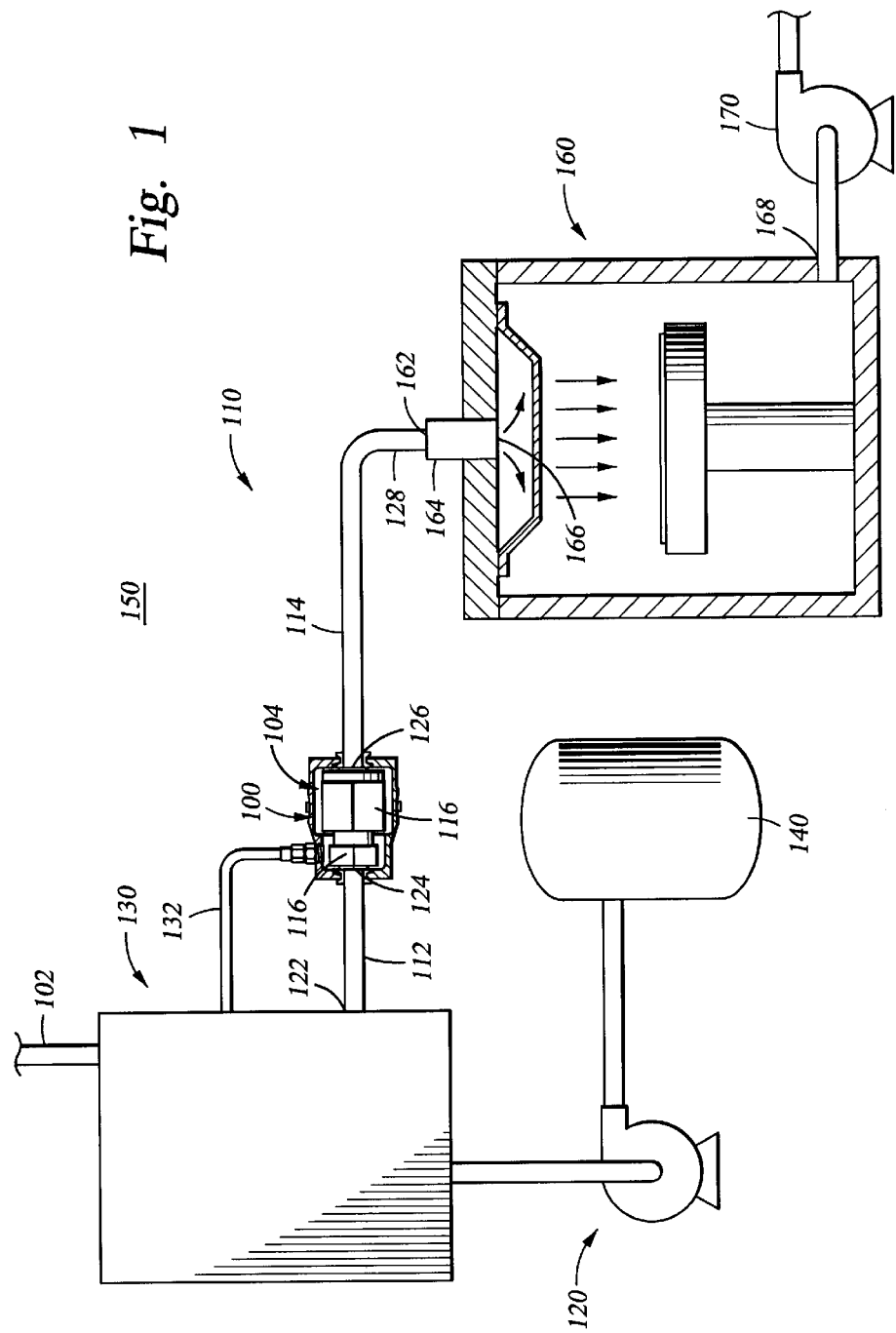
FIG. 1 depicts a simplified schematic of a semiconductor processing system having one embodiment of a containment apparatus.

FIG. 1 generally depicts a containment apparatus 100 utilized with a fluid conduit 110 that couples a gas panel 130 and a semiconductor processing chamber 160. Although the conduit 110 is shown as a single fluid line, it is representative of additionally conduits that may be routed between the gas panel 130 and processing chamber 160 requiring fluid containment. The exemplarily gas panel 130 and processing chamber 160 may be part of any number of semiconductor processing systems, for example, a physical vapor deposition system, an etch system or a chemical vapor deposition system, among others. Such systems are commercially available from Applied Materials, Inc, of Santa Clara, Calif.

The gas panel 130 generally provides fluids at a controlled rate and pressure, and in a predetermined sequence to the processing chamber 160. A plurality of fluid source lines generally supplies the gas panel 130 with a predetermined number of gases. The plurality of fluid source lines are shown and described with reference to FIG. 1 as a single source line 102 providing a single gas for simplicity. The source line 102 may be coupled to a central gas source serving the facility or to individual gas vessels not shown. A central vacuum system 120 generally couples to the gas panel 130 to a gas recovery system 140 by a vacuum line. The vacuum system 120 generally allows the gas panel 130 to operate at a reduced pressure relative to an environment 150 surrounding the gas panel 130. Thus, any inadvertent fluid leakage with the gas panel 130 is pulled into the gas recovery system 140 and prevented from entering the surrounding environment 150.

The gas recovery system 140 generally treats or removes certain fluids pulled from the gas panel 130 so that a portion of the fluid that leaves the gas recovery system 140 into the environment meets a predefined level of cleanliness and safety. Removed fluids are typically disposed or recycled according to applicable government and industry regulations.

The processing chamber 160 generally includes at least one port 162 for receiving fluid from the gas panel 130. In the exemplary processing chamber 160, a passage 164 couples the port 162 to an inlet 166 that injects the fluid into the processing chamber 160 to facilitate substrate processing, chamber cleaning or other operation. Fluids and processing byproducts are generally exhausted from the chamber 160 through an exhaust port 168 coupled to a vacuum pump 170 in a conventional manner.

The fluid conduit 110 generally includes a first fluid line 112 and a second fluid line 114 coupled by a fitting 116. The first fluid line 112 has a first end 122 coupled to the gas panel 130 and a second end 124 coupled to a first end 126 of the second fluid line 114 by the fitting 116. A second end 128 of the second fluid line 114 is coupled to the port 162 of the processing chamber 160.

The containment apparatus 100 generally encloses the fitting 116 in an interior volume 104 that is fluidly coupled to the gas panel 130 by a vacuum line 132. The vacuum system 120 coupled to the gas panel 130 generally reduces the pressure within the interior volume 104 of the containment apparatus 100 so that fluids that may escape from the fitting 116 or the portions of the fluid lines disposed within the containment apparatus 100 are pulled into the gas panel 130 and gas recovery system 140, thereby preventing leakage to the surrounding environment 150.

Figure 2:
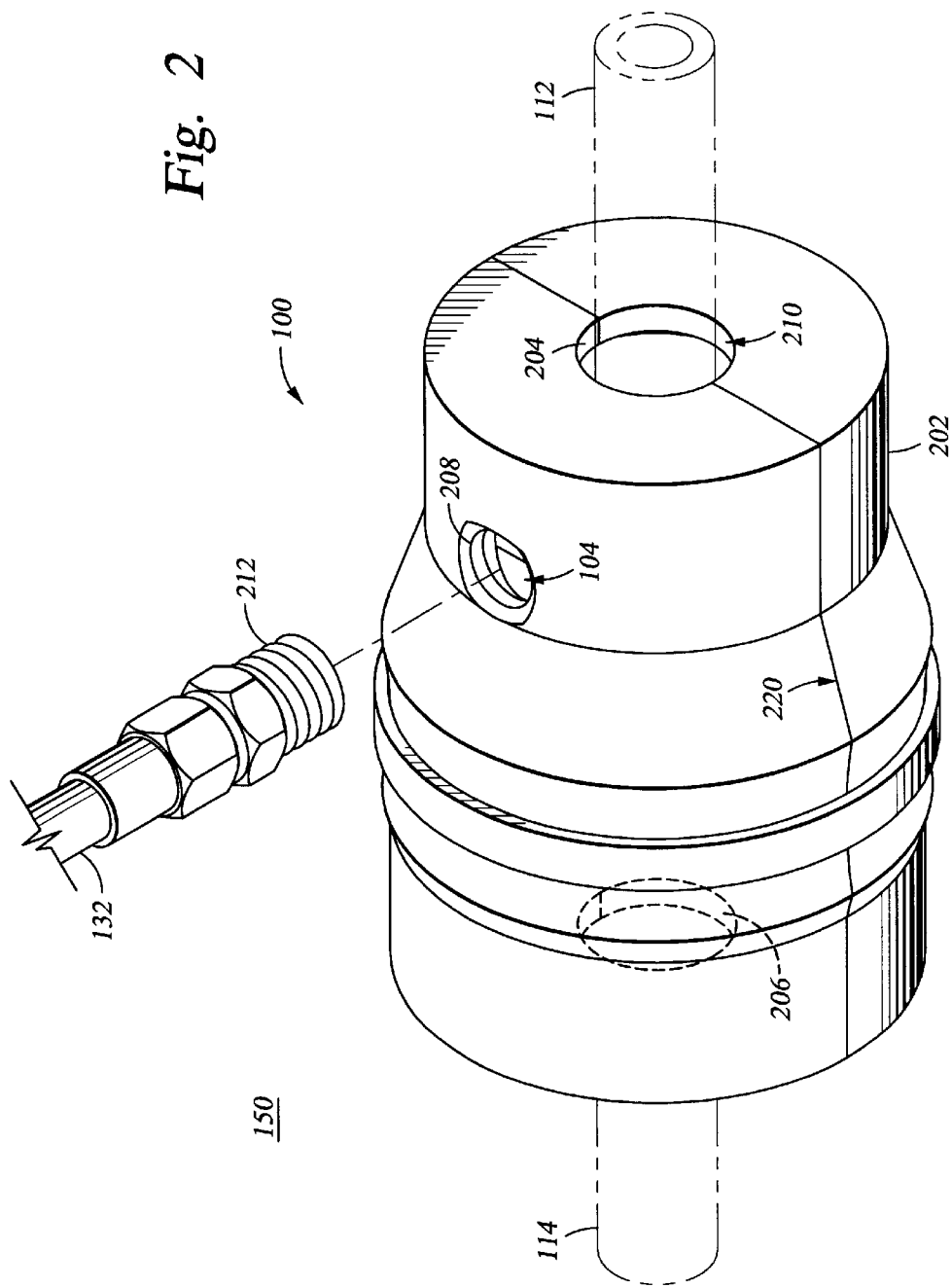
FIG. 2 depicts an isometric view of the containment apparatus of FIG. 1.

FIG. 2 depicts an isometric view of one embodiment of the containment apparatus 100 of FIG. 1. The containment apparatus 100 generally includes a body 202 configured to accept the fitting 116 therein. Accordingly, the size and shape of the body 202 may be fabricated in alternative configurations to accommodate a predetermined size, shape or type of fitting. The body 202 is generally fabricated of a material that is substantially inert with respect to the fluid being transferred through the conduit 110, although other materials may also be used. The body 202 may be fabricated fluoropolymers, polyethylenes, polyamides, polyketones, polyphenylene sulfides, ferrous or non-ferrous metals, ceramics or ceramic/polymer matrix compositions. Depending on the chemistry to be contained, a more robust material could also be used. Typically, a plastic is used to facilitate molding in body 202.

The body 202 generally includes at least three apertures. In one embodiment, a first aperture 204, a second aperture 206 (shown in phantom) and a third aperture 208 are formed through the body 202. The first aperture 204 is generally configured to allow the first fluid line 112 to pass therethrough. The first aperture 204 is configured to allow air from the surrounding environment 150 to be pulled into the interior volume 104 of the body 202 without loss of vacuum. In one embodiment, a gap 210 is defined between the first aperture 204 and first fluid line 112 is sized so that in leakage through the gap 150 may be balanced against a rate of evacuation provided through the third aperture 208 to ensure that pressure within the body 202 remains below that of the surrounding environment 150.

Alternatively, the first aperture 204 may be sealed to the first fluid line 112 to prevent passage of fluid between the interior volume 104 of the body 202 and the surrounding environment 150 through the gap 210. The first aperture 204 may be sealed using adhesives, caulking, bonding of the first fluid line 112 to the body 202, elastomeric seals (i.e., o-rings, gaskets and the like), and compression seals among others. The second aperture 206 is similarly configured to allow the second fluid line 114 to pass therethrough.

The second aperture 206 is similarly configured to accommodate the second fluid line 114. Additional apertures may be formed in the body 202 for fittings such as tee's that couple more than two fluid lines.

The third aperture 208 is generally coupled to the gas panel 130 by the vacuum line 132. Alternatively, the third aperture 208 may be coupled to another device or system that provides a reduced pressure within the interior volume 104 of the body 202 such as a vacuum pump or other similar device. In one embodiment, the third aperture 208 is threaded to accommodate a vacuum fitting 312 that facilitates coupling the body 202 to the gas panel 130. Alternatively, a boss or barbed nipple may be incorporated into the body 202 and having the aperture passing therethrough to directly couple the vacuum line 132 to the body 202. TEFLON® tape, pipe dope or other sealant may be used to prevent leakage between the fitting 312 and the body 252.

Figure 3:
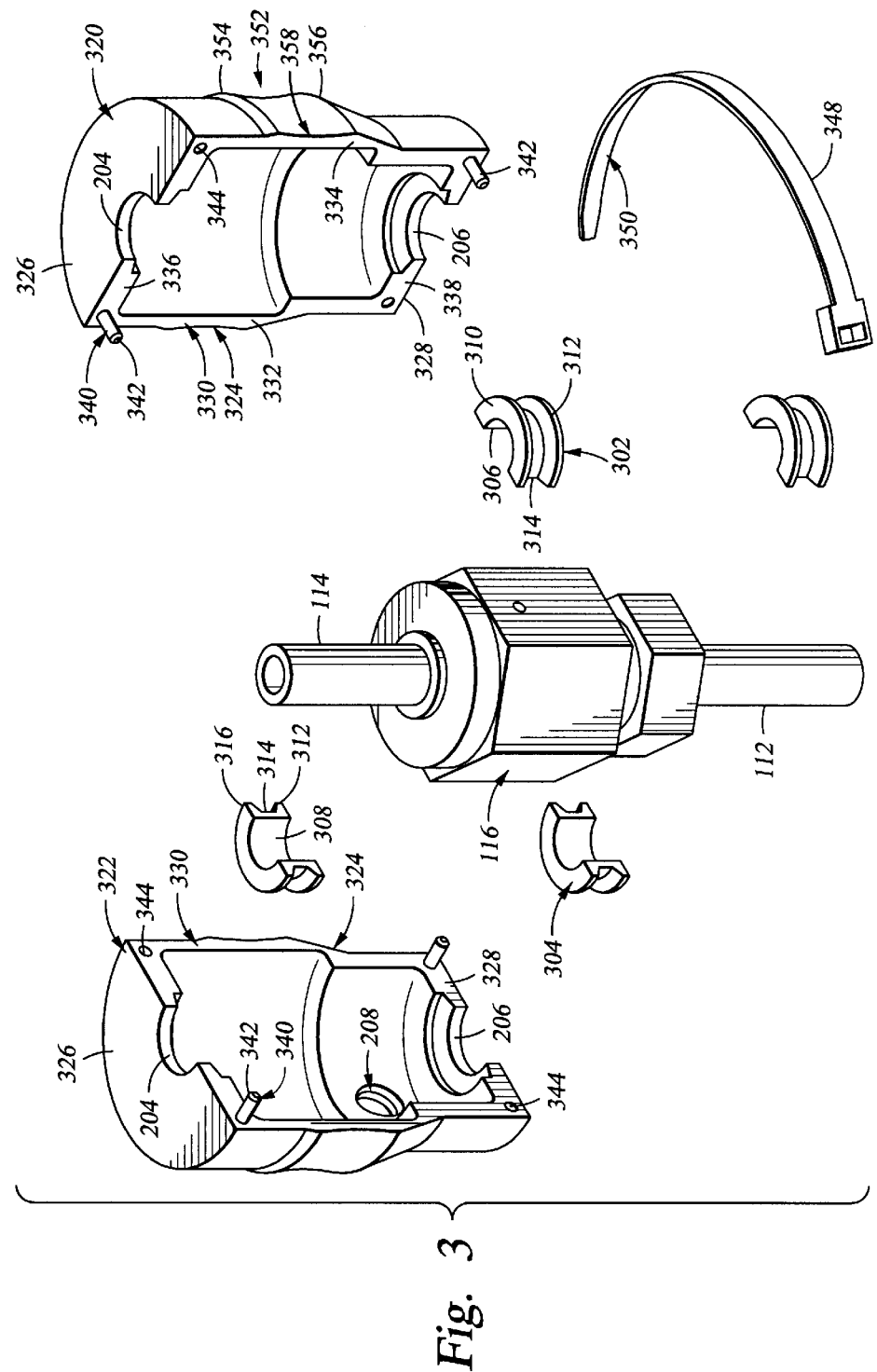
FIG. 3 depicts an exploded isometric view of the containment apparatus of FIG. 2.

FIG. 3 depicts an exploded isometric view of the containment apparatus 100 of FIG. 2. In one embodiment, the body 202 is comprised of a first shell 320 and a second shell 322 that abut to enclose the interior volume of the body 202. The first and second shells 320, 322 are typically two separate components of the body 202, but may optionally be coupled by an integral or independent hinge (not shown) or similar device. The first shell 320 generally includes a substantially cylindrical center section 324 having a first end 326 and a second end 328. The first and second ends 326, 328 are generally formed in a semicircular shape. The first ends 326 of each shell 320, 322 typically include a portion of the first aperture 204 so that the first aperture 204 is formed as the shells 320, 322 are abutted. The second ends 328 of each shell 320, 322 typically include a portion of the second aperture 206 so that the second aperture 206 is formed as the shells 320, 322 are abutted. The third aperture 208 can be formed through either the first or second shells 302, 322, typically through the center section 324. Alternative embodiments of the invention, however, may include apertures formed all in one of the shells 320, 322, at least in part of each of shells 320, 322, and apertures formed at least partially or wholly in one or both of the shells 320, 322 in various combinations.

The shells 320, 322 may additionally be configured to at least partially mate with each other to enhance alignment between the shells 320, 322 and to prevent laterals or other movement therebetween that could adversely effect the operation of the containment apparatus 100. Generally, the perimeter edges of each shell 320, 322 define an abutment surface 330. The abutment surface 330 of one shell is generally disposed against the abutment surface 330 of the opposing shell, thereby defining a parting line 220 (shown in FIGS. 2 and 4) across the body 202. The abutment surface 330 generally includes opposing edges 332, 334 the center portion 324 and edges 336, 338 of each end 326, 328 of the body 202 in which the first and second apertures 204, 206 are defined. The abutment surface 330 of each shell 320, 322 may include one or more mating features 340, for example, a lap or tongue and groove joint, snap fit elements, tapered element to create an interference fit among others, that position and/or retain the shells 320, 322 relative to each other.

In the embodiment depicted in FIG. 3, the mating features 340 includes a plurality posts 342 disposed between the first shell 320 and the second shell 322 to prevent relative movement therebetween. For example, two posts 342 are shown extending from the abutment surface 330 of the first shell 320. The abutment surface 330 of the second shell 322 includes holes 344 formed therein that are adapted to receive the posts 342 protruding from the first shell 320. As the shells 320, 322 are abutted, the posts 342 are at least partially disposed in the holes 344 thereby preventing lateral movement of the shells 320, 322 and positioning the shells 320, 322 relative to one another. Additional mating features 340 may also be used.

Alternatively, each shell 320, 322 may include mating features 340 that are independent from the abutment surface 330. For example, a plurality of bosses (not shown) may extend from the interior of the center portion 324 of each shell 320, 322. Respective bosses from each shell 320, 322 generally align and have a post extending therebetween. The post typically extends from one boss and is received in a hole formed in the aligned boss projecting from the other shell to securely position the shells 320, 322 relative one another.

A biasing member 350 generally retains the first shell 320 to the second shell 322. The biasing member 350 may be a spring, tape, a latch, elastomer, press-fit band or other device that secures the first shell 320 relative to the second shell 322. The biasing member 350 may alternatively be an o-ring, a cable tie, a metallic or plastic ring, a crimped band, a latch, a screw, a rivet, a bolt and an elastomeric band. In the embodiment depicted in FIGS. 2 and 3, the biasing member 350 is a cable tie 348 that circumscribes the body 202 over the center sections 324 of the shells 320, 332. As the cable tie 348 is pulled tight, the abutment surface 330 of the first shell 320 is urged against the abutment surface 330 of the second shell 322 to encapsulate the fitting 116 within the interior volume 104 of the body 202. Generally, the parting line 220 formed between the shells is not gas tight, but allows in leakage therethrough to prevent fluids from within the body 202 from entering the surrounding environment 150. In embodiments wherein in leakage is present along the parting line 220, the rate of flow therethrough is configured to prevent loss of the pressure differential between the interior volume 104 and the surrounding environment 150, thus ensuring that any leaked fluids are drawn out of the containment apparatus 100 through the third port 208. Alternatively, the shells 320, 322 may be adhered, bonded, riveted, welded, or fastened together in a manner that seals or leakingly joins the shells 320, 322 into a unitary body 202.

The cylindrical center sections 324 of the shells 320, 322 generally include a retaining feature 352 for securely positioning the biasing member 350 relative to the body 202. In one embodiment, the exterior of each shell 320, 322 includes a first raised portion 354 and a second raised portion 356. When the shells 320, 322 are abutted, the respective first and second raised portions 354, 356 define an annual depression 358 therebetween. The biasing member 350 is typically fastened around the body 202 in the annual depression 358 so that lateral movement of the biasing member 350 is prevented by the first and second raised portions 354, 356.

Alternatively, embodiments of the invention may include other retaining features (not shown) that may be utilized to prevent lateral movement of the biasing member 350. For example, a channel may be formed in the body 202, or posts or other projections may extend from the body 202 and interface with, or otherwise prevent movement of the biasing member 350.

Optionally, bushings may be disposed in the first and second apertures 204, 206 to facilitate passage of the fluid lines 112, 114. A first bushing 302 is generally disposed in the first aperture 204 between the body 202 and the first fluid line 112. The first bushing 302 may seal the first fluid line 112 to the body 202 or may provide a tighter fit therebetween (i.e., reduce the area of the gap 210) to ensure gross leakage therebetween does not substantially reduce the vacuum within the interior volume 104 of the body 202. The first bushing 302 is typically fabricated from a material compatible with the fluids passing through the conduit 110, for example, stainless steel, a polymer or elastomer, those materials utilized to fabricate the body 202. In one embodiment, the first bushing 302 is comprised of a first portion 306 and a second portion 308. The portions 306, 308 may be abutted, forming a ring circumscribing the first fluid line 112. Each portion 306, 308 includes a first flange 310 and second flange 312 extending radially outward from the portions 306, 308 in a spaced-apart relation. The first and second flanges 310, 312 define an annular channel 314 that is adapted to extend beyond the diameter of the first aperture 204, thereby capturing the first bushing 302 within the aperture and preventing the portions of the body 202 from becoming misaligned or separating from the body 202. Optionally, the portions 306, 308 may be configured to be slightly smaller than half the diameter of the first aperture 204, while an interior radius of the portions 306, 308 substantially equals a radius of the first fluid line 112. Thus, as the portions 306, 308 are mated within the first aperture 204, the portions 306, 308 clamp the first fluid line 112 to ensure minimal leakage therebetween.

An optional second bushing 304 may be utilized at the interface between the second aperture 206 and the second fluid line 114. The second bushing 304 is typically configured similar to the first bushing 302.

Figure 4:
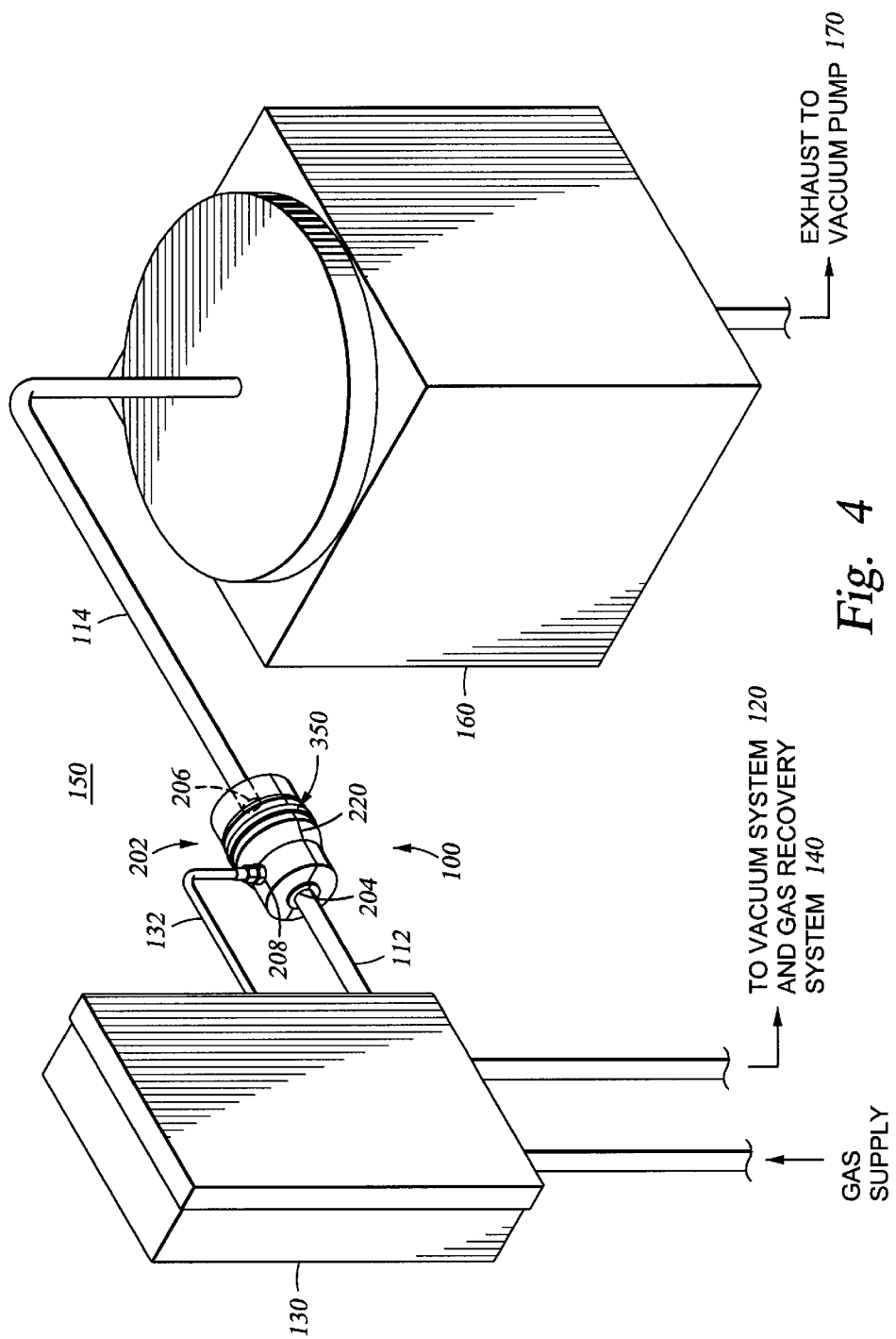
FIG. 4 depicts another isometric view of the containment apparatus of FIG. 1.

FIG. 4 depicts the containment apparatus 100 encapsulating the fitting 116 (not shown in FIG. 4). In operation, a fluid, typically a gas, is provided, flowing through the first fluid line 112 and second fluid line 114 across their junction at the fitting 116. The interior volume 104 of the containment apparatus 100 is evacuated through the third aperture 208. A predetermined rate of evacuation through the third port 208 ensures that in leakage through the parting line 220 and interface between the body 202 (and/or bushings) and fluid lines 112, 114 is maintained. Thus, if the interface between the fitting 116 and fluid lines 112, 114 fails to be gas tight, the leaking fluid is drawn through the third aperture 208 to the gas panel 130 and into the gas recovery system 140. The pressured differential maintained between the interior volume 104 of the body 202 and surrounding environment 150 ensures that leaking fluid is prevented from escaping from the containment apparatus 100 and is delivered to the gas recovery system 140, thus enhancing the safety of person around the processing system while protecting the surrounding environment 150 from release of process or other fluids.

While the foregoing is directed to the preferred embodiment of the present invention, other and further embodiments of the invention may be devised without departing from the basic scope thereof. The scope of the invention is determined by the claims that follow.

What is claimed is:

1. A containment apparatus for preventing leakage from a fitting coupling a first and second fluid supply line to an environment surrounding the fitting, the containment apparatus comprising:
    a body having an interior volume and adapted to substantially enclose the fitting, the body further comprising:
        a first shell; and
        a second shell disposed against the first shell and enclosing the interior volume;
    a retaining feature formed on an exterior of the shells;
    a biasing member disposed around the shells and laterally retained in the retaining feature;
    a first aperture formed through the body;
    a second aperture formed through the body; and
    a third aperture formed through the body.

2. The apparatus of claim 1, wherein the retaining feature further comprises:
    an annular depression or channel.

3. The apparatus of claim 1, wherein the third aperture further comprises:
    a first portion formed in the first shell; and
    a second portion formed in the second shell.

4. The apparatus of claim 1, the wherein the a biasing member at least partially circumscribes the first and second shells of the body.

5. The apparatus of claim 4, wherein the biasing member is selected from the group consisting of an o-ring, a cable tie, a metallic or plastic ring, a spring, a crimped band, tape, an elastomer, press-fit band and an elastomeric band.

6. The apparatus of claim 1, wherein the third aperture is coupled to a vacuum source.

7. The apparatus of claim 1, wherein the first aperture is configured to allow fluid to pass between the body and a supply line coupled to the fitting.

8. The apparatus of claim 1, wherein at least one of the first or second shells include at least one locating feature disposed therebetween.

9. The apparatus of claim 8, wherein the locating feature comprises:
    at least one post extending from first shell; and
    a hole formed in the second shell and adapted to receive the post.

10. A containment apparatus for preventing leakage from a fitting coupling a gas panel to a semiconductor processing chamber, comprising:
    a processing chamber;
    a gas panel;
    a fitting;
    a first fluid supply line coupling the gas panel and the fitting;
    a second fluid supply line coupling the processing chamber and the fitting;
    a vacuum source;
    a first shell having a first abutment surface;
    a second shell having a second abutment surface disposed against the first abutment surface of the first shell, the first and second shells defining a volume that encloses the fitting;
    a gas permeable parting line defined between the first abutment surface and the second abutment surface;
    a first aperture defined between the first shell and second shell;
    a second aperture defined between the first shell and second shell;
    a third aperture formed in the first shell and coupled to the vacuum source; and
    a biasing member adapted to urge the first shell against the second shell.

11. The containment apparatus of claim 10, wherein the third aperture is coupled to the vacuum source through the gas panel.

12. A containment apparatus for preventing leakage from a filling coupling a first and second fluid supply line to an environment surrounding the fitting, the apparatus comprising:
    a first shell having a first abutment surface;
    a second shell having a second abutment surface disposed against the first abutment surface of the first shell, the first and second shells defining a volume adapted to enclose the fitting;
    a gas permeable parting line defined between the first and second abutment surfaces;
    a first aperture formed at least partially in the first shell;
    a second aperture formed at least partially in the second shell; and
    a third aperture formed at least partially In the first shell or second shell, wherein the third aperture is configured to sealingly couple the volume to a vacuum line.

13. The apparatus of claim 12, wherein the first aperture is configured to allow gas passage between the aperture and the first fluid supply line.

14. The apparatus of claim 12, wherein at least one of the first or second shells include at least one locating feature disposed therebetween.

15. The apparatus of claim 14, wherein the locating feature comprises:
    at least one post extending from first shell; and
    a hole formed in the second shell and adapted to receive the post.

16. The apparatus of claim 12, wherein the shells further comprise:
    a retaining feature formed on an exterior of the shells; and
    a biasing member disposed around the shells and laterally retained in the retaining feature.

17. The apparatus of claim 16, wherein the retaining feature further comprises:
    an annular depression or channel.

18. The apparatus of claim 12, wherein the third aperture further comprises:
    a first portion formed in the first shell; and
    a second portion formed in the second shell.

19. The apparatus of claim 12 further comprising a biasing member at least partially circumscribing and urging the first and second shells together.

20. The apparatus of claim 19, wherein the biasing member further comprises at least one element selected from the group consisting of an o-ring, a cable tie, a metallic or plastic ring, a spring, a crimped band, a latch, a rivet, a bolt, tape, an elastomer, press-fit band and an elastomeric band.

21. The apparatus of claim 12, wherein the third aperture is coupled to a vacuum source.

22. A containment apparatus for preventing leakage from a fitting coupling a first and second fluid supply line to an environment surrounding the fitting, the containment apparatus comprising:

a first shell having a first abutment surface;

a second shell having a second abutment surface disposed against the first abutment surface of the first shell, the first and second shells defining a volume adapted to enclose the fitting;

a first aperture defined between the first shell and second shell;

a second aperture defined between the first shell and second shell;

a third aperture formed in the first shell and configured to sealingly couple the volume to a vacuum line; and a biasing member adapted to urge the first shell against the second shell.

23. The apparatus of claim 22, wherein the first and second abutment surfaces define a gas permeable parting line between the first shell and the second shell.

24. The apparatus of claim 22, wherein at least one of the first or second shells include at least one locating feature disposed therebetween.

25. The apparatus of claim 22, wherein the shells further comprise:

a retaining feature formed on an exterior of the shells and adapted to laterally retain the biasing member.

26. A containment apparatus for preventing leakage from a fitting coupling a gas panel to a semiconductor processing chamber, comprising:

a processing chamber;

a gas panel;

a fitting;

a first fluid supply line coupling the gas panel and the fitting;

a second fluid supply line coupling the processing chamber and the fitting;

a vacuum source;

a body removable disposed over the fitting and defining an interior volume that encloses the fitting;

a first aperture formed through the body and having the first supply fluid line disposed therethrough;

a second aperture formed through the body and having the second supply fluid line disposed therethrough;

a third aperture formed through the body; and a vacuum line sealing coupled to third aperture of the body and coupling the interior volume of the body to the vacuum source.

27. The apparatus of claim 26, wherein the body further comprises:

a first shell having a first abutment surface; and a second shell having a second abutment surface disposed against the first abutment surface of the first shell, the first and second shells defining the interior volume.

28. The apparatus of claim 27 further comprising:

a biasing member adapted to urge the first shell against the second shell.

29. The apparatus of claim 27 wherein the body further comprises:

a gas permeable parting line defined between the first abutment surface and the second abutment surface.

30. A containment apparatus for preventing leakage from a fitting coupling a first and second fluid supply line to an environment surrounding the fitting, the containment apparatus comprising:

a body having an interior volume and adapted to substantially enclose the fitting, the body further comprising:

a first shell; and a second shell disposed against the first shell and defining a gas permeable parting line therebetween;

at least one of one of a latch, a rivet, a bolt coupling the shells;

a first aperture formed through the body;

a second aperture farmed through the body; and a third aperture formed through the body and configured to sealingly couple the body to a vacuum line.

* * * * *